(12) United States Patent
Kim et al.

(10) Patent No.: US 9,022,415 B2
(45) Date of Patent: May 5, 2015

(54) COVER FOR AIRBAG DEVICE, AND AIRBAG DEVICE

(75) Inventors: Minhun Kim, Yokohama (JP); Jinhua Piao, Yokohama (JP); Atsushi Yamada, Yokohama (JP)

(73) Assignee: Autoliv Development AB, Vårgårda (SE)

( * ) Notice: Subject to any disclaimer, the term of this patent is extended or adjusted under 35 U.S.C. 154(b) by 6 days.

(21) Appl. No.: 13/979,213

(22) PCT Filed: Dec. 19, 2011

(86) PCT No.: PCT/JP2011/079390
§ 371 (c)(1),
(2), (4) Date: Jul. 11, 2013

(87) PCT Pub. No.: WO2012/096103
PCT Pub. Date: Jul. 19, 2012

(65) Prior Publication Data
US 2013/0300091 A1 Nov. 14, 2013

(30) Foreign Application Priority Data

Jan. 11, 2011 (JP) ................................. 2011-003333

(51) Int. Cl.
*B60R 21/215* (2011.01)
*B60R 21/213* (2011.01)

(52) U.S. Cl.
CPC ....... *B60R 21/215* (2013.01); *Y10T 428/24008* (2015.01); *B60R 21/213* (2013.01)

(58) Field of Classification Search
CPC ...... B60R 21/20; B60R 21/215; B60R 21/217
USPC .......................................... 280/728.1, 728.2
See application file for complete search history.

(56) References Cited

U.S. PATENT DOCUMENTS 5,651,562 A * 7/1997 Hagen et al. ................ 280/728.3
5,765,862 A * 6/1998 Bentley ...................... 280/728.3
(Continued)

FOREIGN PATENT DOCUMENTS

DE  102004021438 A1 * 6/2005 .............. B60R 21/16
GB  2434343 A  * 7/2007
(Continued)

OTHER PUBLICATIONS

Machine translation of DE102004021438.*
(Continued)

*Primary Examiner* — Nicole Verley
*Assistant Examiner* — Barry Gooden, Jr.
(74) *Attorney, Agent, or Firm* — Brinks Gilson & Lione

(57) ABSTRACT

A cover for an airbag device, which includes: a cover portion configured to cover an airbag in a folded state; a hollow insertion portion configured to be inserted into an attachment hole on the vehicle; a locking portion inserted into the attachment hole together with the insertion portion and locked at the vehicle; and a connecting portion provided inside the insertion portion and connecting inner surfaces of the insertion portion with each other so as to reinforce the insertion portion. The cover portion, the insertion portion, the locking portion, and the connecting portion are integrally formed, and the connecting portion is present at least at a position closer to a distal end side of the insertion portion in an insertion direction than the position of the attachment hole when the locking portion is locked.

19 Claims, 14 Drawing Sheets

(56) References Cited

U.S. PATENT DOCUMENTS

| | | | | |
|---|---|---|---|---|
| 6,145,870 A * | 11/2000 | Devane et al. | | 280/728.2 |
| 6,565,116 B1 * | 5/2003 | Tajima et al. | | 280/730.2 |
| 6,883,828 B2 * | 4/2005 | Ohki | | 280/730.2 |
| 7,159,894 B2 * | 1/2007 | Ronne et al. | | 280/728.2 |
| 7,172,209 B2 * | 2/2007 | Totani et al. | | 280/728.2 |
| 7,290,795 B2 * | 11/2007 | Kawai et al. | | 280/730.2 |
| 7,832,693 B2 * | 11/2010 | Moerke et al. | | 248/71 |
| 7,900,953 B2 * | 3/2011 | Slobodecki et al. | | 280/728.2 |
| 8,096,574 B2 * | 1/2012 | Okimoto et al. | | 280/728.2 |
| 8,186,709 B2 * | 5/2012 | She | | 280/730.2 |
| 8,297,645 B2 * | 10/2012 | Thurston et al. | | 280/728.2 |
| 8,430,421 B2 * | 4/2013 | Kirchen et al. | | 280/728.2 |
| 8,696,018 B2 * | 4/2014 | Yamamoto | | 280/728.2 |
| 2003/0107202 A1 * | 6/2003 | Tajima et al. | | 280/728.3 |
| 2004/0239080 A1 * | 12/2004 | Berrahou et al. | | 280/728.2 |
| 2005/0052001 A1 * | 3/2005 | Totani et al. | | 280/728.2 |
| 2005/0062263 A1 * | 3/2005 | Kawai et al. | | 280/728.2 |
| 2005/0217083 A1 * | 10/2005 | Tashima et al. | | 24/297 |
| 2005/0285374 A1 * | 12/2005 | Kawai et al. | | 280/728.2 |
| 2005/0285375 A1 * | 12/2005 | Kawai et al. | | 280/728.2 |
| 2006/0197317 A1 * | 9/2006 | Watanabe | | 280/728.2 |
| 2007/0241540 A1 * | 10/2007 | Takemura et al. | | 280/728.2 |
| 2008/0014045 A1 * | 1/2008 | Kawai | | 411/45 |
| 2008/0061535 A1 * | 3/2008 | Everard et al. | | 280/728.2 |
| 2008/0073888 A1 * | 3/2008 | Enriquez | | 280/730.2 |
| 2009/0091105 A1 * | 4/2009 | Okimoto et al. | | 280/728.3 |
| 2009/0205174 A1 * | 8/2009 | Slobodecki et al. | | 24/458 |
| 2010/0072735 A1 * | 3/2010 | Kirchen et al. | | 280/728.2 |
| 2010/0295272 A1 * | 11/2010 | Aoki | | 280/728.2 |
| 2011/0057423 A1 * | 3/2011 | Tago et al. | | 280/728.2 |
| 2011/0109064 A1 * | 5/2011 | Best et al. | | 280/728.2 |
| 2011/0133434 A1 * | 6/2011 | Kirchen et al. | | 280/728.2 |
| 2011/0156377 A1 * | 6/2011 | Slobodecki et al. | | 280/728.2 |
| 2011/0221170 A1 * | 9/2011 | Thurston et al. | | 280/728.1 |
| 2012/0112440 A1 * | 5/2012 | Isayama et al. | | 280/728.3 |
| 2013/0257025 A1 * | 10/2013 | Yamamoto | | 280/728.2 |
| 2013/0292926 A1 * | 11/2013 | Kim et al. | | 280/728.2 |

FOREIGN PATENT DOCUMENTS

| | | | | |
|---|---|---|---|---|
| JP | 9317746 | A | | 12/1997 |
| JP | 2002067856 | A | | 3/2002 |
| JP | 2007161169 | A | * | 6/2007 |
| JP | 2008057751 | A | | 3/2008 |
| JP | 2009090703 | A | | 4/2009 |

OTHER PUBLICATIONS

Machine translation of GB2434343.*

International Search Report of PCT/JP2011/079390 Mailed on Feb. 7, 2012, 3 pages.

* cited by examiner

COVER FOR AIRBAG DEVICE, AND AIRBAG DEVICE

BACKGROUND OF THE INVENTION

1. Field of the Invention

The present invention relates to an airbag device equipped in a vehicle, and in particular, to a cover attached to a vehicle so as to cover an airbag in a folded state.

2. Description of the Related Art

A curtain airbag device that deploys an airbag in a curtain shape during side collision to protect the head portion of an occupant is known as an airbag device for vehicles. For example, in a curtain airbag device disclosed in Japanese Patent Application Laid-open No. 2009-90703, a cover that stores a folded airbag is formed to be integral with an elastically deformable clip and is assembled into a vehicle by pushing the clip to be inserted into an attachment hole of a roof side rail.

In this cover, the clip is hollow. By utilizing elastic restoration of the clip during assembling, a base portion of the clip pushed from the interior side to the exterior side is locked at the frame of the attachment hole.

In such a cover, a load occurring during deployment of the airbag is applied to the base portion of the clip. However, since the base portion of the clip is hollow and elastically deformable, the base portion is likely to be deformed by the load applied during the deployment of the airbag. Thus, the deformed clip may be removed from the attachment hole, and the airbag may not properly deploy in an intended direction.

In particular, when the cover and the clip are formed from a relatively soft material, the above-described problem is likely to occur, and during assembling, it is difficult to push the clip into the attachment hole, which suggests room for improvement.

SUMMARY

Therefore, an object of the present invention is to provide a cover for an airbag device, and an airbag having the same, which is rarely removed from a vehicle during deployment of an airbag, and which can be formed from materials selected with an increased degree of freedom and be satisfactorily assembled into a vehicle.

In order to attain the object, a cover for an airbag device according to the present invention is attached to a vehicle and includes: a cover portion configured to cover an airbag in a folded state; a hollow insertion portion configured to be inserted into an attachment hole on the vehicle; a locking portion inserted into the attachment hole together with the insertion portion and locked at the vehicle; and a reinforcing portion provided inside the insertion portion so as to reinforce the insertion portion, wherein the cover portion, the insertion portion, the locking portion, and the reinforcing portion are integrally formed, and the reinforcing portion is extended from an inner surface of the insertion portion so that when the locking portion is locked, the reinforcing portion is present at least at a position closer to a distal end side of the insertion portion in an insertion direction than the position of the attachment hole.

According to the present invention, since the hollow insertion portion is reinforced, it is possible to suppress the insertion portion from being deformed by the load occurring during deployment of the airbag. In particular, in the locked state where the cover is attached at the vehicle, since the reinforcing portion is at least positioned closer to the distal end side of the insertion portion in the insertion direction than the position of the attachment hole, unlocking resulting from deformation of the insertion portion rarely occurs. Thus, even when the cover is formed from a relatively soft material, it is possible to suppress the cover from being removed from the vehicle during deployment of the airbag. In addition, since the strength of a portion of the insertion portion where the reinforcing portion is present has improved, the load occurring when the insertion portion is inserted into the attachment hole can easily be transmitted to the insertion portion, and the cover can be easily assembled into the vehicle.

Preferably, the reinforcing portion is a connecting portion that connects the inner surfaces of the insertion portion with each other.

According to this configuration, it is possible to further suppress deformation of the insertion portion as compared to when the inner surfaces of the insertion portion are not connected. Moreover, since the load applied during deployment of the airbag can be absorbed by the connecting portion as well as the locking portion, retention properties during the deployment are improved.

More preferably, the insertion portion has such a cross-sectional shape that a length in a horizontal direction is longer than a length in a vertical direction, and the connecting portion includes a plurality of vertical connecting portions disposed to be spaced from each other in the horizontal direction so as to connect the inner surfaces of the insertion portion with each other in the vertical direction.

According to this configuration, the load applied during deployment of the airbag can be distributed to and absorbed by a plurality of vertical connecting portions. Moreover, since a plurality of vertical connecting portions is provided, it is easy to suppress the insertion portion from being rotated and removed during deployment of the airbag when only one vertical connecting portion is provided. Further, since the insertion portion has an oblong cross-sectional shape, the insertion portion is ideal for receiving a load applied in the vertical direction. Moreover, since the direction of the insertion portion in relation to the attachment hole is defined, the workability to assemble the cover into the vehicle is improved.

More preferably, the connecting portion further includes a horizontal connecting portion that extends from the plurality of vertical connecting portions in the horizontal direction so as to connect the plurality of vertical connecting portions with each other.

According to this configuration, since the strength of the insertion portion is further improved, retention properties during deployment of the airbag are further improved. Moreover, since the load when the insertion portion is inserted into the attachment hole can be easily transmitted to the insertion portion, the assembling workability is also improved.

More preferably, an end surface of the horizontal connecting portion closer to the airbag is accessible when an operator inserts the insertion portion into the attachment hole.

According to this configuration, since an operator can insert the insertion portion into the attachment hole by directly pressing the horizontal connecting portion, the transmission of the pushing load is improved, and assembling workability is further improved.

More preferably, the cover further includes a base portion provided in a region where the airbag is not deployed so as to be extended from the cover portion. Moreover, the base portion includes a first surface in which the insertion portion is formed so as to protrude; and a second surface on a side opposite to the first surface, having the end surface of the horizontal connecting portion closer to the airbag.

According to this configuration, when the insertion portion is inserted into the attachment hole, the base portion can be effectively used. For example, the operator can insert the insertion portion protruding from the first surface into the attachment hole by pressing the end surface of the horizontal connecting portion on the second surface while holding the base portion.

According to another preferred aspect of the present invention, the vertical connecting portion is connected to the first surface of the base portion.

By doing so, since the vertical connecting portion is connected across both the insertion portion and the base portion inside the insertion portion, the insertion portion can be further reinforced.

Preferably, the base portion has a penetration hole that penetrates through the first and second surfaces, and the penetration hole is formed at such a position that the locking portion can be seen from the second surface through the penetration hole and that the locking portion can be operated to be in an unlocked state.

According to this configuration, when the cover is removed from the vehicle during replacement or maintenance, the operator can unlock the locking portion while viewing the locking portion.

Preferably, the locking portion is, when locked at the vehicle, bent and deformed in a direction closer to the horizontal connecting portion and is then deformed in a direction away from the horizontal connecting portion due to elastic restoration, whereby the locking portion is locked at the vehicle, and the horizontal connecting portion restricts a maximum amount of bending of the locking portion.

According to this configuration, the horizontal connecting portion can be effectively used to function as a stopper for the locking portion that bends and deforms.

More preferably, a pair of the locking portions is provided so as to face each other with the horizontal connecting portion interposed therebetween.

According to this configuration, it is possible to provide sufficient locking properties as compared to single-side locking and to suppress unlocking when a load in a rotation direction is applied during deployment of the airbag.

Preferably, the reinforcing portion is extended from the inner surface of the insertion portion so that when the locking portion is locked, the reinforcing portion is also present at the position of the attachment hole and at a position closer to a rear end of the insertion portion in the insertion direction than the position of the attachment hole.

By doing so, the retention properties during deployment of the airbag can be further improved.

Preferably, the reinforcing portion is not formed in a distal end portion of the insertion portion in the insertion direction but is formed only in a rear end portion of the insertion portion.

By doing so, partial portions that are effective for retention during deployment of the airbag can be reinforced. Due to this, it is possible to decrease the amount of materials (for example, the amount of resins) required for the reinforcing portion while securing the retention required for the reinforcing portion and to decrease the weight of the cover.

Preferably, the cover portion, the insertion portion, the locking portion, and the reinforcing portion are integrally formed from a thermoplastic elastomer. Moreover, it is more preferable to use olefins (TPO) as the thermoplastic elastomer.

By doing so, a cover having rubber-like elasticity can be provided, and the cover can be used in a wide range of temperatures (for example, −35° C. to 80° C.).

An airbag device according to the present invention includes the cover according to the present invention and an airbag covered by the cover portion.

Due to this, as described above, since the cover is rarely removed from the vehicle during deployment of the airbag, the airbag can be properly deployed in an intended direction.

DETAILED DESCRIPTION

Hereinafter, an example in which an airbag device according to a preferred embodiment of the present invention is applied to a curtain airbag device will be described with reference to the accompanying drawings. For reference, only in FIG. 1, a front side of a vehicle is denoted by arrow FR, and an upper side of the vehicle is denoted by arrow UP. In this description, positional relationship such as front, rear, up, and down used in association with each unit of the airbag device is based on the positional relationship such as front, rear, up, and down of a vehicle, unless otherwise stated. Moreover, the following embodiments are examples for describing the present invention, and it is not intended to limit the present invention to the embodiments only.

Figure 1:
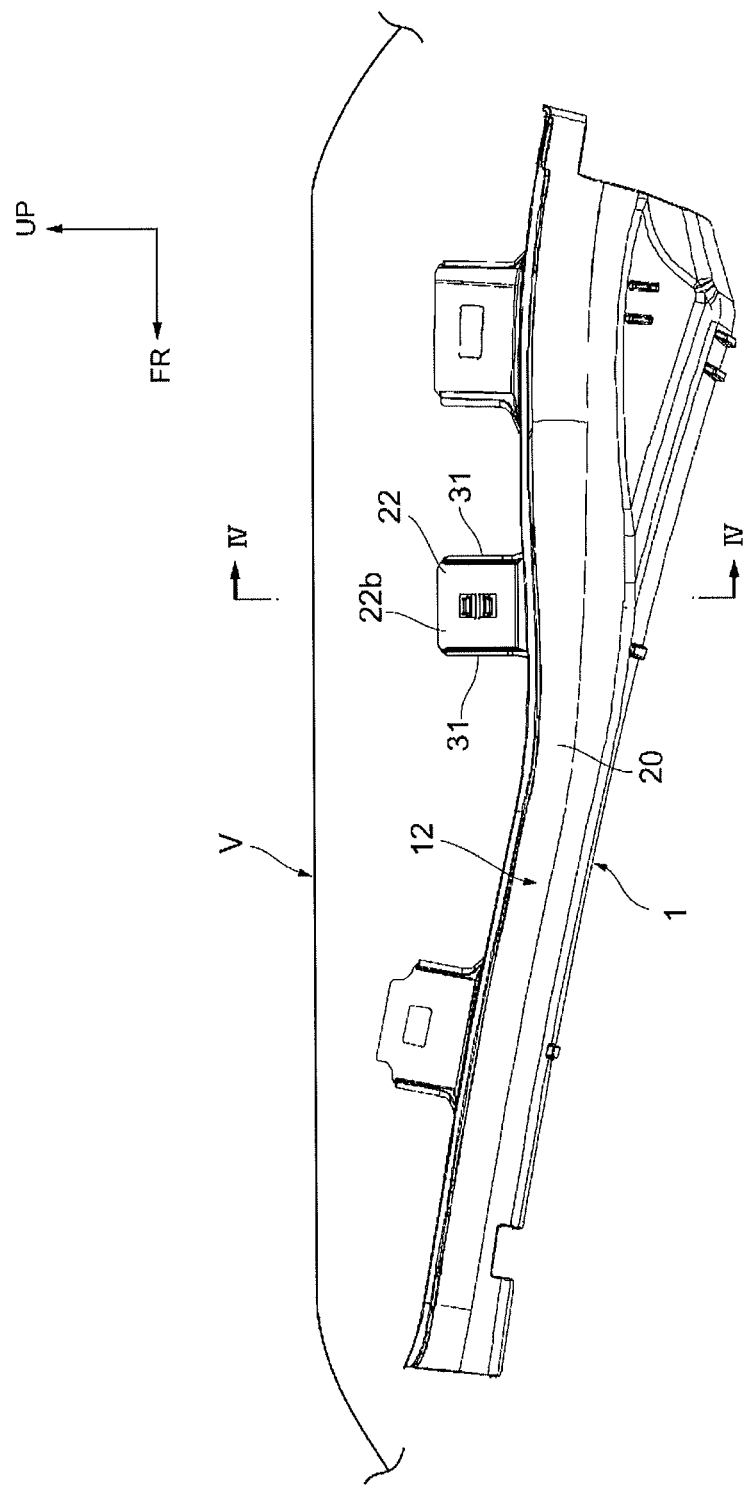
FIG. 1 is a side view as seen from an interior side of a vehicle, showing an airbag device according to an embodiment of the invention together with a schematic of the vehicle.
Figure 4:
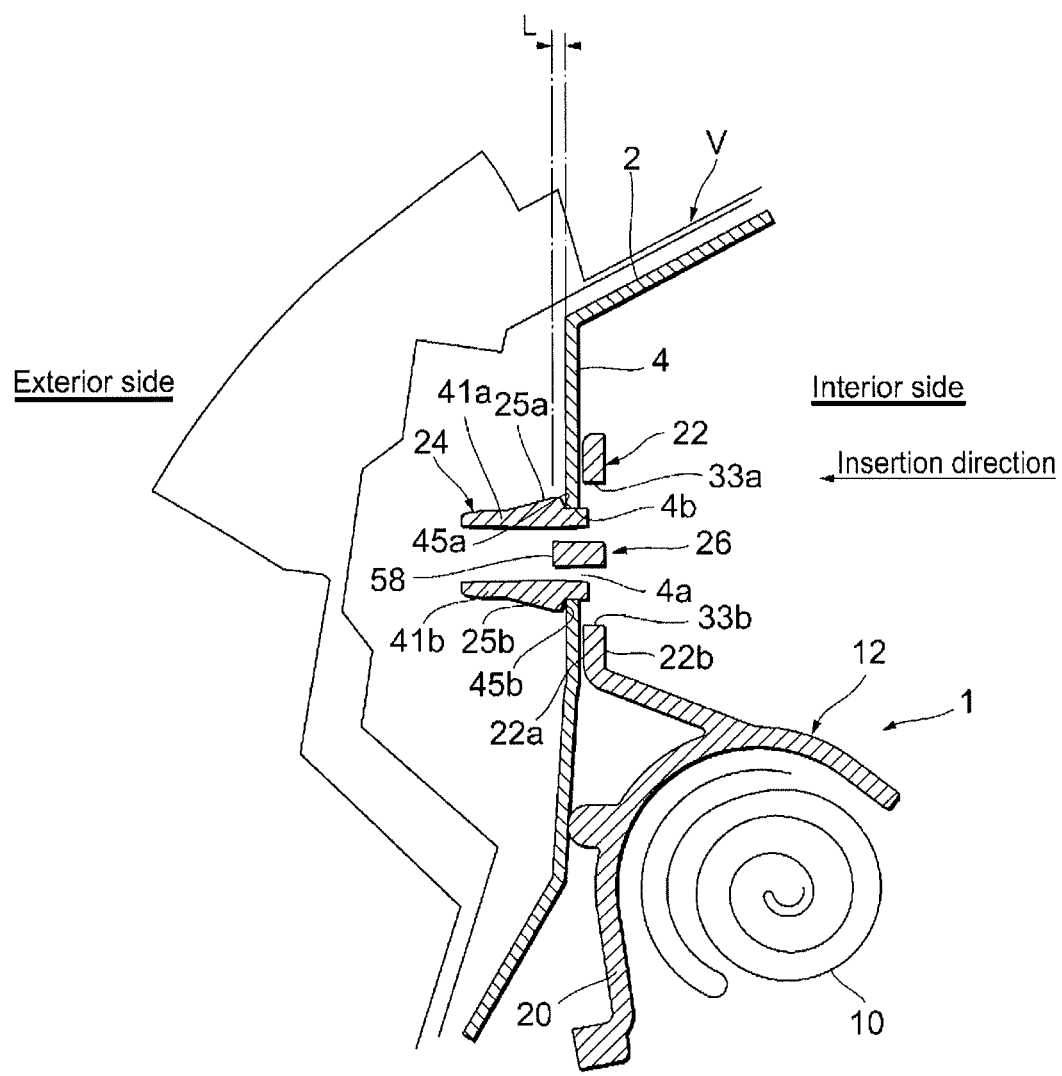
FIG. 4 is an end view generally taken along line IV-IV of FIG. 1, showing a state where the airbag device of FIG. 1 is attached to a vehicle, which is schematically shown.

As shown in FIG. 1, a curtain airbag device 1 (hereinafter referred to simply as an "airbag device 1") is provided in an upper edge of a side portion of a vehicle V so as to extend in a front-rear direction of the vehicle, and for example, is attached to a roof side rail 2 of the vehicle V as shown in FIG. 4. The roof side rail 2 is formed by welding a plurality of panel members to have a closed cross-section, and the airbag device 1 is attached to an inner panel 4 which is one of the panel members on the interior side.

The airbag device 1 mainly includes an airbag 10 (see FIG. 4), a cover 12 that is attached to the vehicle V so as to cover the airbag 10 in a folded state, and an inflator (not shown) that supplies inflation gas to the airbag 10.

The airbag 10 is formed in a bag shape by sewing fabrics or the like at an appropriate position and is deformed from a folded state to a deployed state when inflation gas is supplied. The airbag 10 in the folded state has a long shape and is rolled up and stored in the cover 12. The airbag 10 in the folded state may have a roll shape as shown in FIG. 4 and may have an accordion shape or a combination thereof. The airbag 10 is deployed downward from the roof side rail 2 in a curtain shape along a side window or the like so that the head portion of an occupant is protected during side collision of the vehicle V.

Figure 2:
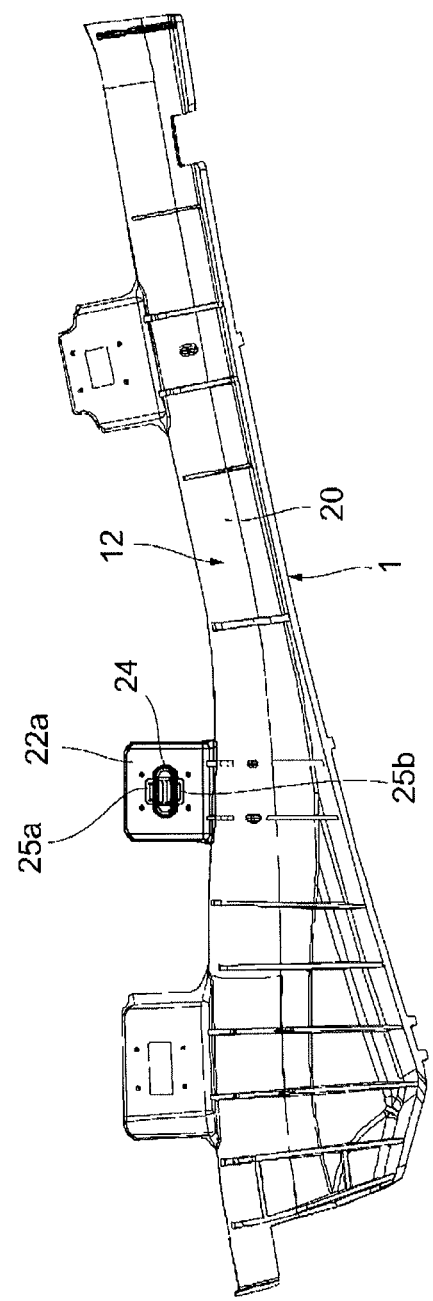
FIG. 2 is a side view of the airbag device of FIG. 1, as seen from an exterior side of a vehicle.
Figure 3:
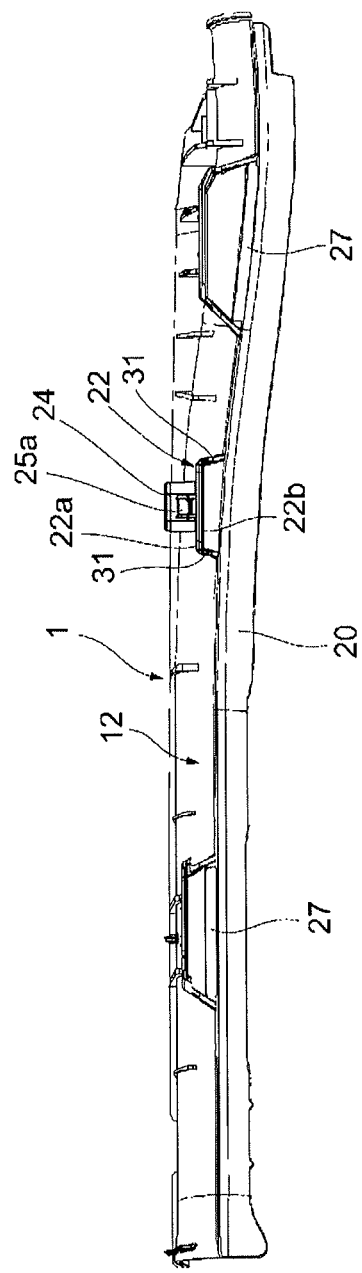
FIG. 3 is a plan view of the airbag device of FIG. 1, as seen from above.

As shown in FIGS. 1 to 3, the cover 12 is a generally long member, and a longitudinal length thereof is longer than the length of the folded long airbag 10. Moreover, as shown in FIG. 4, the cover 12 is disposed on the interior side along the inner panel 4.

As shown in FIGS. 1 to 4, the cover 12 includes a cover portion 20 having an approximately C-shaped cross-section covering the airbag 10 in the folded state, a tab-shaped base portion 22 provided so as to extend upward from the cover portion 20, and a hollow insertion portion 24 formed so as to protrude from the base portion 22. Moreover, as shown in FIG. 4, locking portions 25a and 25b, which lock to the vehicle V, and a connecting portion 26, that connects the inner parts of the insertion portion 24, are formed as part of the insertion portion 24 of the cover 12.

The respective portions 20 to 26 of the cover 12 having such a configuration are integrally formed from a thermoplastic elastomer. Thus, the respective portions 20 to 26 of the cover 12 are made from a relatively soft material and have predetermined rubber-like elasticity such that the portions are bent when pressed by an operator. Although various thermoplastic elastomers can be used, it is preferable to use olefins (TPO), and a combination of polypropylene and EPDM is a preferred example thereof. By using the cover 12 made from such a thermoplastic elastomer, the cover can be appropriately used in a wide range of temperatures (for example, −35° C. to 80° C.) under which the vehicle V is used.

The material of the cover 12 is not limited to a thermoplastic elastomer, and a hard resin (for example, polypropylene only) may be used as the material of the cover 12. However, in the case of a hard resin, since the cover 12 (in particular, the insertion portion 24) may be broken during deployment of the airbag 10 under temperatures below the freezing point such as −35° C., the usable area of the cover 12 may be limited. Although a thermoplastic elastomer having rubber-like elastic properties is ideal as the material of the cover 12 according to the present embodiment, other relatively soft materials may be used.

Next, the cover portion 20 and the base portion 22 of the cover 12 will be described.

As shown in FIGS. 1 to 3, the cover portion 20 has approximately the same length as the full length of the cover 12 and extends while bending in the front-rear direction of the vehicle V. The approximately C-shaped cross-section of the cover portion 20 may be constant and may change partially in the longitudinal direction of the cover 12. The partially changing shape of the cross-section may include a U-shape, an inverted squared C-shape, and a semicircular shape. As shown in FIG. 4, in a state where the cover 12 is attached to the vehicle V, an opening of the approximately C-shaped cross-section of the cover portion 20 faces downward. Thus, the folded airbag 10 stored in the cover portion 20 deploys downward.

Although not described in detail, holes 27 are formed so as to penetrate through an upper portion of the cover portion 20 with the base portion 22 interposed (see FIG. 3). A tab fabric sewn to an upper end portion of the airbag 10 is passed to the outside of the cover portion 20 through these holes 27, and the tab fabric is fixed to a side edge of a vehicle cabin.

As shown in FIGS. 1 to 3, the base portion 22 is a planar portion that protrudes upward from a portion of the cover portion 20, and flanges 31 are formed on both sides in the front-rear direction of the planar portion so as to stand up toward a side opposite to the insertion portion 24. The flanges 31 may be omitted.

As shown in FIG. 4, the base portion 22 is positioned on the interior side and is positioned in an upper region in which the airbag 10 is not deployed. Moreover, in this attached state, a large area of a front surface 22a (first surface) on the exterior side of the base portion 22 faces the inner panel 4 from the interior side so as to encircle the attachment hole 4a, and a rear surface 22b (second surface) on the interior side of the base portion 22 is positioned in an interior space so that the rear surface 22b can be accessed from the interior side. In the attached state, the front surface 22a of the base portion 22 may make abutting contact with a surface on the interior side of the inner panel 4, and the inner panel 4 may be sandwiched between the base portion 22 and the locking portions 25a and 25b. To realize such sandwiching, although a portion of the abutting front surface 22a may be configured as a convex portion 35 described later, the present invention is not limited to this.

Figure 5A:
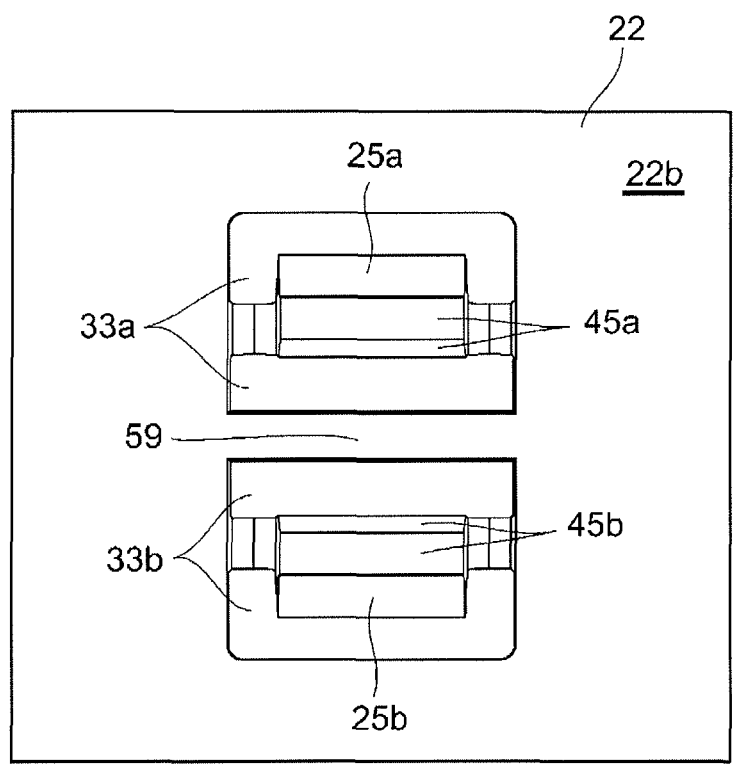
FIG. 5A is an enlarged side view showing a base portion of the airbag device of FIG. 1 at an enlarged scale.
Figure 5B:
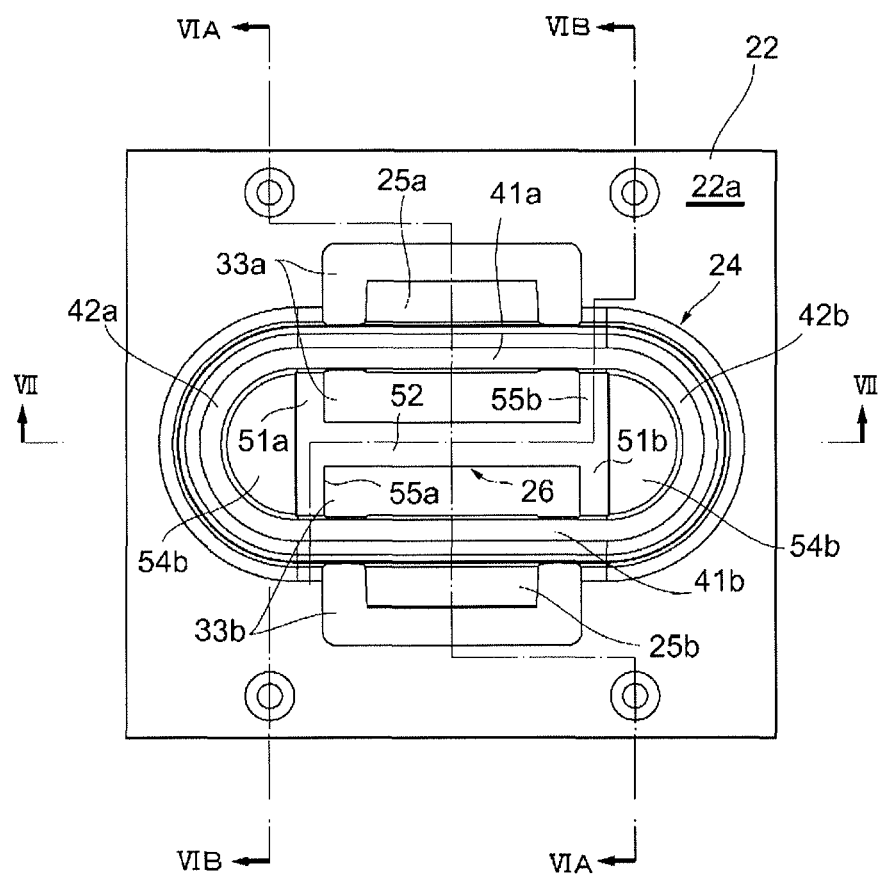
FIG. 5B is an enlarged side view showing a base portion of the airbag device of FIG. 2 at an enlarged scale.
Figure 6A:
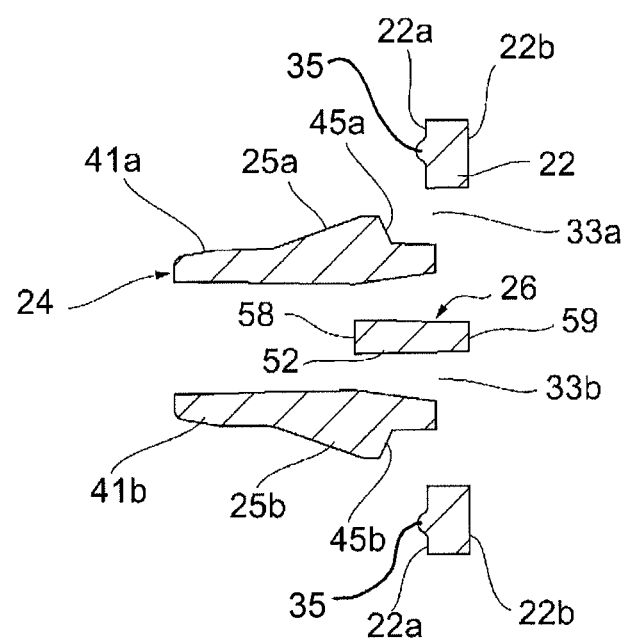
FIG. 6A is an end view taken along line VIA-VIA of FIG. 5B.

As shown in FIGS. 5A, 5B, and 6A, a penetration hole 33a, through which the locking portion 25a can be seen from the rear surface 22b, and a penetration hole 33b, through which the locking portion 25b can be seen from the rear surface 22b, are formed in the base portion 22 as penetration holes that penetrate through the front and rear surfaces 22a and 22b. The penetration holes 33a and 33b are configured as oblong rectangles and are formed to be vertically partitioned by a horizontal rib 52 of the connecting portion 26 as shown in FIG. 6A.

Figure 6B:
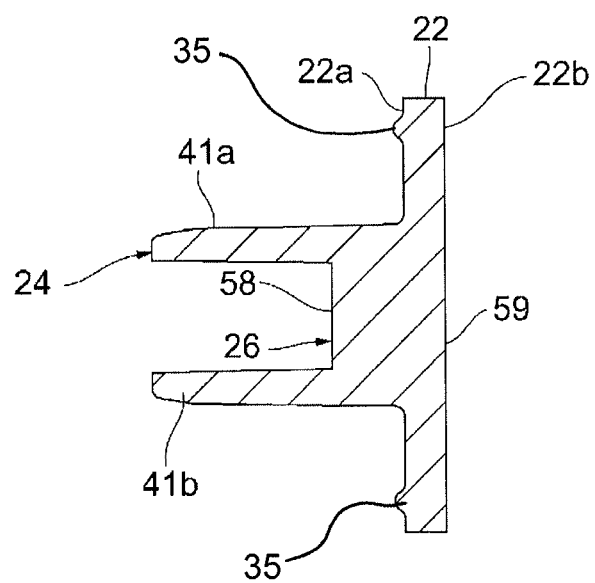
FIG. 6B is an end view taken along line VIB-VIB of FIG. 5B.

As shown in FIGS. 5B, 6A, and 6B, four convex portions 35 in total are formed on the front surface 22a of the base portion 22 around the insertion portion 24. The convex portions 35 are portions that protrude from the front surface 22a in a dot shape. In this example, a vertical cross-section has a semicircular shape, and a horizontal cross-section has a circular shape. The four convex portions 35 are disposed such that two each are above and below the insertion portion 24 and are disposed vertically and horizontally symmetrical about a line that passes through the center of the insertion portion 24. From another perspective, when a circle is drawn around the center of the insertion portion 24, the four convex portions 35 are positioned on the trace of the circle. The convex portions 35 are configured to make contact with the surface on the interior side of the inner panel 4 in the attached state shown in FIG. 4. Due to this, even when the base portion 22 is slightly moved in relation to the inner panel 4 with vibration during traveling of the vehicle V, the base portion 22 makes contact with the inner panel 4 at the plurality of convex portions 35. Due to the convex portions 35, noise generated during contacting between the base portion 22 and the inner panel 4 is suppressed.

The number, the shape, and the arrangement of the convex portions 35 can be designed appropriately. For example, the number of convex portions 35 may be increased from 4, and when the number of convex portions 35 is decreased to 1, the convex portion 35 may be configured as a continuous ring-shaped portion. However, from the perspective of allowing the base portion 22 to make balanced contact with the inner panel 4, it is preferable to provide a plurality of convex portions 35, and it is more preferable to arrange the convex portions 35 in the above-described manner. Although a noise suppression portion is realized by the convex portions 35 of the base portion 22, the present invention is not limited to this. For example, the noise suppression portion may be realized by providing a shock absorbing member or a noise absorbing member (a sponge-like resin or the like) on the front surface 22a of the base portion 22 as a separate member from the base portion 22. However, from the perspective of decreasing the number of components, the convex portions 35 integrated with the base portion 22 as the noise suppression portion are preferable.

Next, the insertion portion 24, the locking portions 25a and 25b, and the connecting portion 26 will be described.

Figure 5C:
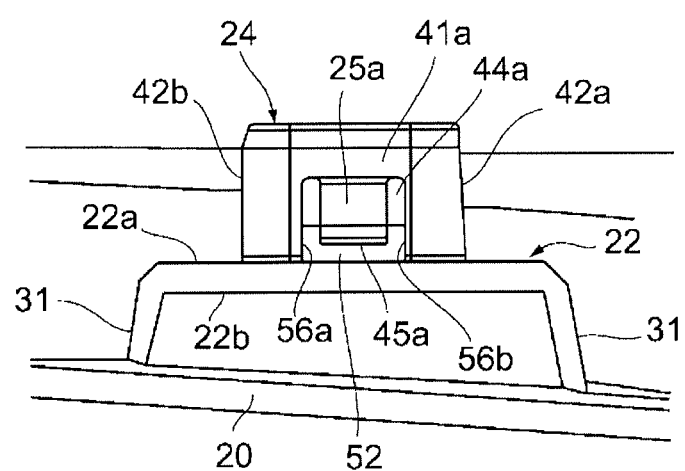
FIG. 5C is an enlarged plan view showing a base portion of the airbag device of FIG. 3 at an enlarged scale.

As shown in FIG. 5C, the insertion portion 24 protrudes vertically from a central portion of the front surface 22a (first surface) of the base portion 22. Moreover, the insertion portion 24 is inserted into the attachment hole 4a on the vehicle V in an insertion direction shown in FIG. 4. The attachment hole 4a penetrates through the inner panel 4, for example.

As shown in FIGS. 5B, 5C, 6A, and 6B, the insertion portion 24 is a cylindrical portion having an oblong cross-sectional shape. Specifically, in the cross-section of the insertion portion 24, side walls 41a and 41b extending in a horizontal direction which is approximately the same direction as the front-rear direction (or the longitudinal direction of the cover portion 20) of the vehicle V are longer than side walls 42a and 42b extending in a vertical direction which is the up-down direction of the vehicle V. In this example, the cross-section of the insertion portion 24 has a generally track shape. Such an oblong cross-sectional shape is not limited to the track shape but may include an elliptical shape, an oval shape, a rectangular shape, and the like. In particular, when a rectangular cross-sectional shape is employed, it is possible to decrease the width (horizontal width) of the insertion portion 24 and the width of the base portion 22 while securing the same performance as when an elliptical cross-sectional shape is employed. Thus, it is possible to decrease the size of the insertion portion 24 and the base portion 22. The rectangular cross-sectional shape includes a rounded rectangular cross-sectional shape in which the corners of the rectangle are rounded.

As shown in FIGS. 6A and 6B, the thickness of the insertion portion 24 is constant except for the portion where the locking portions 25a and 25b and the connecting portion 26 are formed, and for example, the thickness is approximately the same as the thickness of the cover portion 20 and the base portion 22. Moreover, an outer surface of a distal end portion (hereinafter, referred to as a distal end portion of the insertion portion 24) in the insertion direction of the insertion portion 24 is chamfered so that the insertion portion 24 is guided into the attachment hole 4a during insertion. On the other hand, the connecting portion 26 is integrally formed in a rear end (hereinafter sometimes referred to as a rear end portion or a base end portion of the insertion portion 24) in the insertion direction of the insertion portion 24. The locking portions 25a and 25b are formed in an intermediate portion between the distal end portion and the rear end portion of the insertion portion 24.

As shown in FIGS. 5B, 5C, and 6A, the locking portions 25a and 25b are hook-shaped (claw-shaped) portions that are integrated with the side walls 41a and 41b of the insertion portion 24. Specifically, as shown in FIG. 5C, the locking portion 25a is formed as an elastic piece that extends from the side wall 41a to the base portion 22 in a cantilevered manner by forming a slit 44a in the side wall 41a so that the side wall 41a is notched in a U-shape from the center of an end portion closer to the base portion 22. The locking portion 25a has a locking step portion 45a at its free end. The locking portion 25b is also formed in the side wall 41b similarly to the locking portion 25a and has a locking step portion 45b at its free end (see FIG. 6A). As shown in FIG. 6A, the locking portions 25a and 25b extend to be inclined so that the locking step portions 45a and 45b are away from the side walls 41a and 41b, and the locking step portions 45a and 45b reach the inside of the penetration holes 33a and 33b and are positioned at the vertically central position.

When the locking portions 25a and 25b having such a configuration are locked at the vehicle V, the insertion portion 24 is pushed into the attachment hole 4a as shown in FIG. 4. Then, the locking portions 25a and 25b make contact with a frame 4b that defines the attachment hole 4a and are pressed and bent toward the inner side of the insertion portion 24 by the frame 4b. When the insertion portion 24 is pushed further, the locking portions 25a and 25b are deformed toward the outer side of the insertion portion 24 due to elastic restoration, and the locking step portions 45a and 45b make pressing contact with the frame 4b. As a result, the locking portions 25a and 25b are locked at the frame 4b on the vehicle V, and the insertion portion 24 is retained in the attachment hole 4a.

A lock receiving portion on the vehicle V to which the locking portions 25a and 25b are locked is not limited to the frame 4b of the attachment hole 4a. For example, a separate lock receiving portion may be provided on the vehicle V at a position located closer to the exterior side than the attachment hole 4a.

On the other hand, when the locking portions 25a and 25b locked at the vehicle V are unlocked, an operator accesses the locking step portions 45a and 45b from the interior side through the penetration holes 33a and 33b and operates the locking step portions 45a and 45b in an unlocking direction. Specifically, a removing tool such as a pair of tweezers is inserted into the penetration holes 33a and 33b from the interior side to bend the locking step portions 45a and 45b toward the inner side of the insertion portion 24. By doing so, the locking step portions 45a and 45b are unlocked from the frame 4b, and the insertion portion 24 can be pulled out toward the interior side from the attachment hole 4a. Such unlocking is performed during replacement or maintenance of the airbag device 1.

Figure 7:
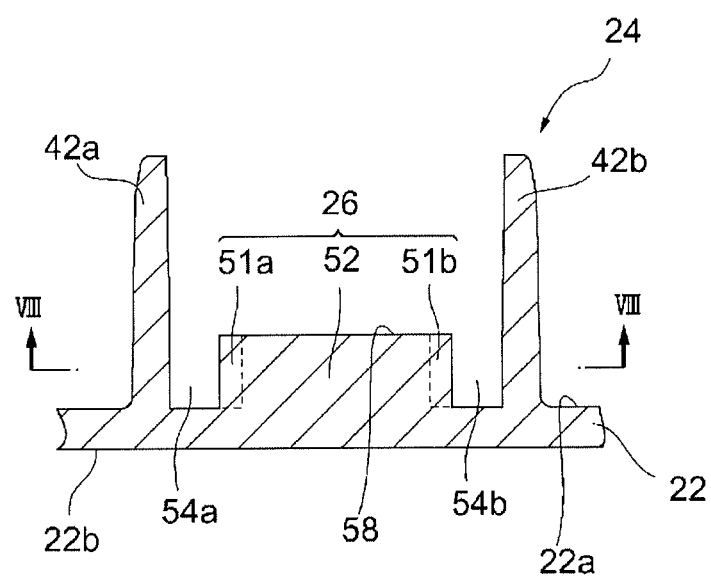
FIG. 7 is a cross-sectional view taken along line VII-VII of FIG. 5B.
Figure 8:
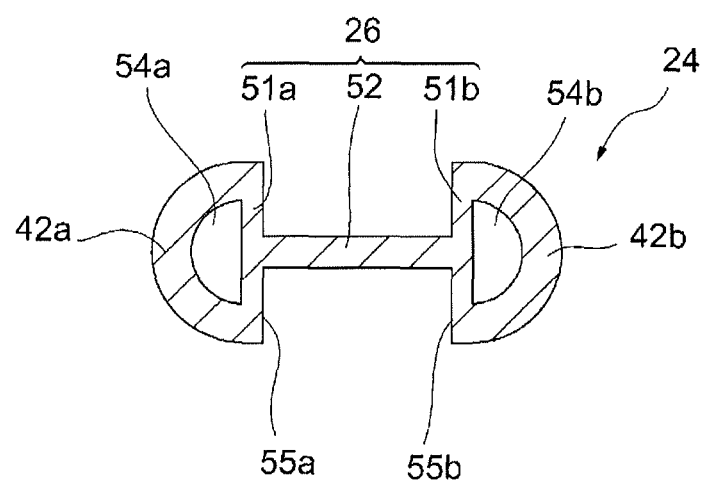
FIG. 8 is a cross-sectional view taken along line VIII-VIII of FIG. 7.

As shown in FIGS. 7 and 8, the connecting portion 26 is formed in a base end portion of the insertion portion 24 to reinforce the base end portion of the insertion portion 24. Specifically, as shown in FIGS. 5B and 8, the connecting portion 26 includes a pair of vertical ribs 51a and 51b connecting the side walls 41a and 41b of the insertion portion 24 and a horizontal rib 52 connecting the vertical ribs 51a and 51b. The thickness of the vertical ribs 51a and 51b and the horizontal rib 52 can be appropriately designed, and in this example, the horizontal rib 52 is thicker than the vertical ribs 51a and 51b. Moreover, the thickness of the horizontal rib 52 may be constant, and in this example, the thickness gradually increases as it advances from the base end portion of the insertion portion 24 toward the distal end portion (see FIG. 6A).

As shown in FIGS. 5B and 8, the pair of vertical ribs 51a and 51b is disposed to be spaced from each other in the oblong direction (horizontal direction) of the insertion portion 24, and is disposed with semicircular-shaped spaces 54a and 54b interposed between the vertical ribs 51a and 51b and the side walls 42a and 42b of the insertion portion 24. Moreover, as shown in FIG. 5B, the locking portions 25a and 25b are positioned between the pair of vertical ribs 51a and 51b, and end surfaces 55a and 55b of the vertical ribs 51a and 51b closer to the locking portions 25a and 25b are continuous to be flush with end surfaces 56a and 56b of the side walls 41a and 41b, notched to form the locking portions 25a and 25b (see FIG. 5C).

As shown in FIGS. 5B and 8, the horizontal rib 52 extends horizontally from an intermediate portion of the vertical ribs 51a and 51b so as to connect the vertical ribs 51a and 51b, and a predetermined gap is formed between the vertical ribs 51a and 51b and the side walls 41a and 41b of the insertion portion 24. For reference, both end portions in the horizontal rib 52 indicated by broken lines in FIG. 7 are the portions where the vertical ribs 51a and 51b are present.

The vertical ribs 51a and 51b and the horizontal rib 52 are generally H-shaped continuous ribs and stand up vertically from the front surface 22a of the base portion 22. Here, the heights of the vertical ribs 51a and 51b and the horizontal rib 52 are lower than the insertion portion 24, and in this example, the heights are the same. Moreover, the vertical ribs 51a and 51b and the horizontal rib 52 extend up to a position where the ribs face the locking step portions 45a and 45b (see FIG. 5C). Thus, in the attached state shown in FIG. 4, the connecting portion 26 having the vertical ribs 51a and 51b and the horizontal rib 52 is arranged across both the interior side and the exterior side while passing through the attachment hole 4a.

More specifically, in the attached state shown in FIG. 4, a distal end surface 58 of the vertical ribs 51a and 51b and the horizontal rib 52 in the insertion direction is positioned so as to protrude further toward the exterior side (that is, the distal end side of the insertion portion 24) than the attachment hole 4a. In this case, a protrusion length L of the distal end surface 58 is preferably 1 mm or more from the exterior-side end surface of the inner panel 4, and the length is not limited to this.

As described above, the penetration holes 33a and 33b of the base portion 22 are vertically partitioned by the horizontal rib 52 (see FIGS. 5A and 6A). In this case, a rear end surface 59 (an end surface closer to the airbag 10) of the horizontal rib 52 in the insertion direction is a surface that defines the space between the penetration holes 33a and 33b. That is, the rear end surface 59 of the horizontal rib 52 constitutes a portion of the rear surface 22b of the base portion 22 and is flush with other portions of the rear surface 22b.

Moreover, the horizontal rib 52 may also function as a stopper that restricts the maximum bending amount of the locking portions 25a and 25b. Specifically, as shown in FIG. 6A, the horizontal rib 52 facing the locking step portions 45a and 45b makes abutting contact with the locking step portions 45a and 45b when the locking portions 25a and 25b are bent in such a direction that the locking step portions 45a and 45b approach the horizontal rib 52.

Operational effects of the cover 12 of the airbag device 1 according to the present embodiment described above will be described.

1. Improvement in Assembling Properties

As described above, the operation of assembling the cover 12 into the vehicle V is carried out by inserting the insertion portion 24 into the attachment hole 4a from the interior side toward the exterior side and locking the locking portions 25a and 25b to the frame 4b of the attachment hole 4a as shown in FIG. 4. Thus, assembling of the cover 12 into the vehicle V can be realized by a one-touch operation.

Further, when inserting the insertion portion 24 into the attachment hole 4a, the operator can push the rear surface 22b of the base portion 22 from the interior side toward the exterior side. In this case, the pushing load is effectively transmitted to the insertion portion 24 and the locking portions 25a and 25b via the base portion 22 and the connecting portion 26. This is because the connecting portion 26 enhances the strength of the base end portion of the insertion portion 24 closer to the base portion 22.

Thus, the operator can easily insert the insertion portion 24, and the operation (that is, assembling operation) of locking the locking portions 25a and 25b formed in the insertion portion 24 at the vehicle V is facilitated.

In particular, when pushing the insertion portion, the operator can apply a load around the horizontal rib 52 exposed to the rear surface 22b of the base portion 22 and apply a load directly to the horizontal rib 52. Thus, the pushing load is effectively transmitted to the insertion portion 24 and the locking portions 25a and 25b, and the operator can easily perform the inserting and assembling operations.

2. Improvement in Removal Suppressing Properties during Deployment of Airbag

As described above, since the hollow base end portion of the insertion portion 24 is reinforced by the connecting portion 26, the insertion portion 24 is suppressed from being deformed by the load occurring during deployment of the airbag 10. In particular, since the load applied during deployment of the airbag can be absorbed by the vertical ribs 51a and 51b as well as the locking step portions 45a and 45b of the locking portions 25a and 25b, the amount of such deformation that the insertion portion 24 is broken can be decreased as compared to a hollow insertion portion that does not have the vertical rib.

Moreover, in an assembled state, since the portion of the connecting portion 26 including the vertical ribs 51a and 51b closer to the distal end side is positioned closer to the exterior side than the attachment hole 4a, unlocking resulting from deformation of the insertion portion 24 occurs rarely during deployment of the airbag. Further, in the assembled state, since the portion of the connecting portion 26 closer to the base end is positioned at a position where the portion overlaps the attachment hole 4a and is positioned closer to the interior side than the attachment hole 4a, unlocking occurs more rarely. Thus, it is possible to suppress the insertion portion 24 from being removed from the attachment hole 4a during deployment of the airbag and to allow the airbag 10 to properly deploy in an intended downward direction.

Moreover, even when the locking portions 25a and 25b are bent according to the load applied during deployment of the airbag, the locking step portions 45a and 45b make contact with the horizontal rib 52 so that the movement of the locking portions 25a and 25b is restricted. Due to this, the horizontal rib 52 enhances the strength of the insertion portion 24 and transmission of the pushing load during insertion and suppresses unlocking during deployment of the airbag.

<Modifications>

Hereinafter, several modifications of the present embodiment will be described.

The base portion 22 may be omitted from the cover 12. In this case, the insertion portion 24 may be extended from the outer surface of the cover portion 20. However, rather than this configuration, as in the above embodiment, it is preferable to provide the base portion 22 so as to be extended from the cover portion 20 and to provide the insertion portion 24 so as to protrude from the base portion 22. This is because the assembling workability is improved and removing of the cover 12 from the interior side is also made easy.

The ratio of a horizontal length to a vertical length of the insertion portion 24 may be changed while maintaining the oblong shape. In this case, when the horizontal length is decreased, only the height of the vertical ribs 51*a* and 51*b* may be increased without changing the height of the horizontal rib 52, for example.

The locking step portions 25*a* and 25*b* may employ various locking structures such as a double-cantilevered locking structure as disclosed in Japanese Patent Application Laid-open No. 2009-90703, for example, without being limited to the cantilevered hook-shaped locking structure described above. Moreover, the locking portions 25*a* and 25*b* may be configured as a pair of left and right locking portions and a single locking portion only without being limited to the pair of upper and lower locking portions described above. However, in order to appropriately receive the repulsive force of the airbag 10 deploying downward, it is preferable to form the locking portions 25*a* and 25*b* in the upper and lower portions of the insertion portion 24 as in the embodiment.

As for the connecting portion 26, the horizontal rib 52 as the horizontal connecting portion may be omitted, and the number of vertical ribs 51*a* and 51*b* as the vertical connecting portion is not limited to 2. Although only one vertical rib may be provided, three or more vertical ribs, and preferably two, may be provided taking the momentum applied during deployment of the airbag into consideration. The reason is as follows. Due to the repulsive force during deployment of the airbag, the cover 12 (the insertion portion 24) may rotate about a locking point (the locking step portions 45*a* and 45*b*) around the shaft of the insertion portion 24. In this case, if two or more vertical ribs are present, since the rotation of the cover 12 (the insertion portion 24) can be suppressed at the position near the locking point, it is possible to effectively prevent removal of the insertion portion 24.

Moreover, although the connecting portion 26 is configured as a generally H-shaped rib having the vertical ribs 51*a* and 51*b* and the horizontal rib 52, the connecting portion 26 may be configured as a generally X-shaped rib. Further, although the horizontal rib 52 is configured to horizontally connect the intermediate portions of the vertical ribs 51*a* and 51*b*, the upper and lower ends of the vertical rib 51*a* and the lower and upper ends of the vertical rib 51*b* may be connected in a cross-linked shape (X-shape).

Further, although the connecting portion 26 is formed in only the base end portion of the insertion portion 24, in another embodiment, the connecting portion 26 may be formed across the base end portion and the distal end portion of the insertion portion 24. However, in the sense of reinforcing the portions effective for retention during deployment of the airbag in a necessary range, it is preferable to form the connecting portion 26 in only the base end portion of the insertion portion 24 without forming in the distal end portion of the insertion portion 24 as described above. With this configuration, it is advantageous from the perspective of decreasing the amount of the thermoplastic elastomer required for the connecting portion 26 and decreasing the weight of the cover 12.

In another embodiment, a reinforcing portion other than the connecting portion 26 may be formed inside the insertion portion 24 to reinforce the insertion portion 24. Such a reinforcing portion may not connect the inner surfaces of the insertion portion 24. For example, a bracket-shaped portion may be formed inside the insertion portion 24 so as to be integrated with the base end portions of the side walls 41*a* and 41*b* of the insertion portion 24. In this case, the bracket-shaped portion functions as a reinforcing portion that reinforces the insertion portion 24. As a specific example, two bracket-shaped portions may be formed at each of the positions corresponding to the vertical ribs 51*a* and 51*b* so as to face each other, and the two facing bracket-shaped portions may be extended from the inner surfaces of the side walls 41*a* and 41*b*. In this case, the bracket-shaped portions may be vertically connected from the front surface 22*a* of the base portion 22.

Figure 9A:
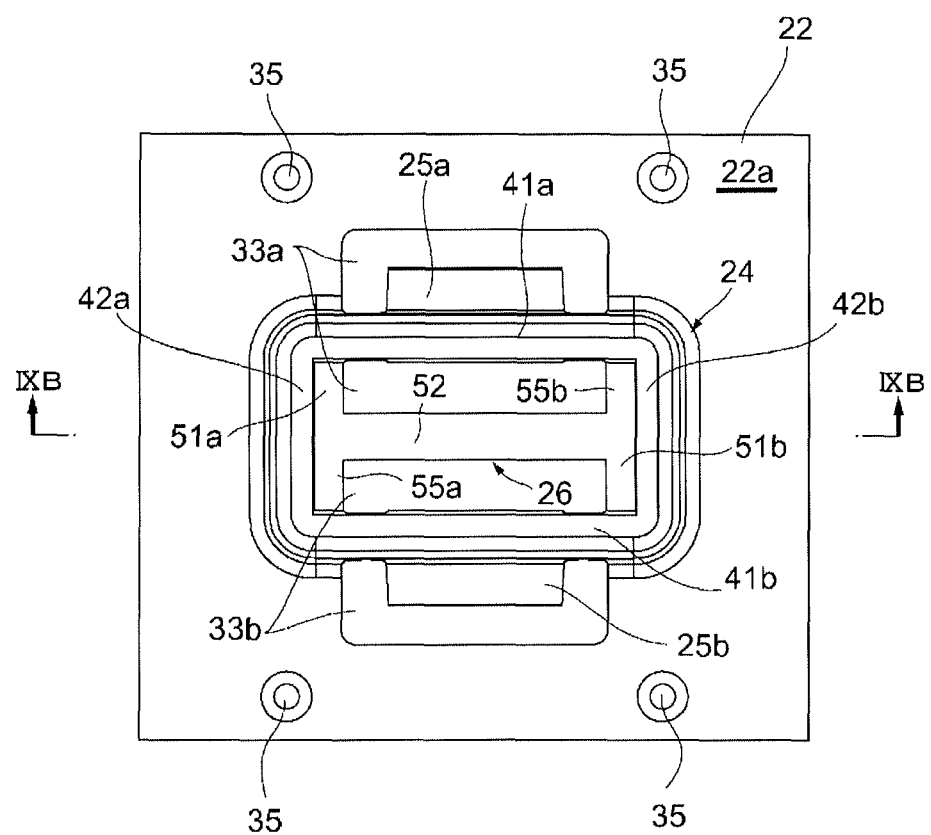
FIG. 9A is an enlarged side view showing a base portion of an airbag device according to another embodiment at an enlarged scale.
Figure 9B:
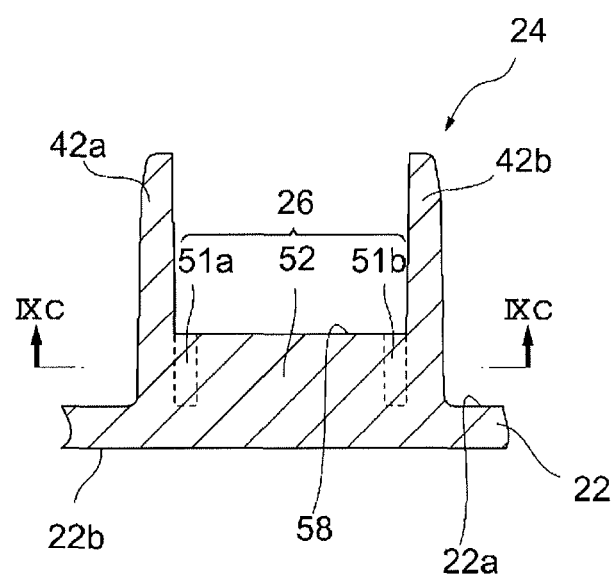
FIG. 9B is a cross-sectional view taken along line IXB-IXB of FIG. 9A.
Figure 9C:
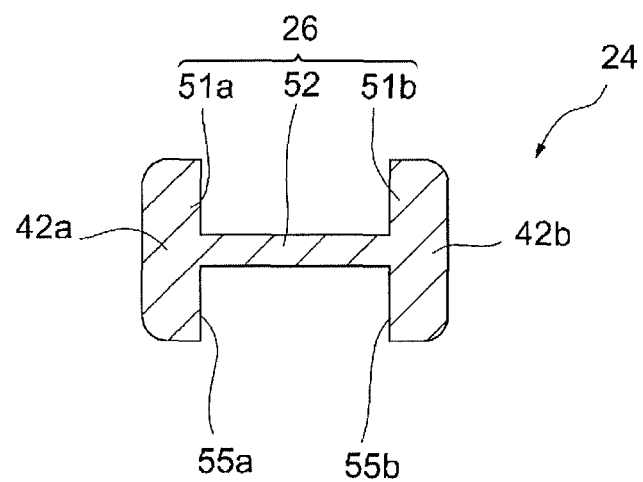
FIG. 9C is a cross-sectional view taken along line IXC-IXC of FIG. 9B.

Further, the insertion portion 24 and the connecting portion 26 may employ another embodiment shown in FIGS. 9A to 9C. In this embodiment, the insertion portion 24 has a rectangular cross-sectional shape, the side walls 42*a* and 42*b* of the insertion portion 24 are integrated with the vertical ribs 51*a* and 51*b* of the H-shaped connecting portion 26, and the semilunar-shaped spaces 54*a* and 54*b* of the above-described embodiment are omitted. With such a configuration, it is possible to decrease the width (horizontal length) of the insertion portion 24 and the width of the base portion 22 and to further decrease the size of the cover.

The cover 12 of the present embodiment can be applied to an airbag device that protects portions of an occupant other than the head portion without being limited to the curtain airbag device. Moreover, the cover 12 and the airbag device 1 according to the present invention can be applied to other transportation means other than a vehicle.

What is claimed is:

1. A cover for an airbag of an airbag device, the cover to be attached to a vehicle via an attachment hole of the vehicle, comprising:
   a cover portion configured to cover the airbag in a folded state;
   a hollow insertion portion having a pair of opposed sidewalls connected by end walls and being configured to be inserted into the attachment hole on the vehicle in an insertion direction;
   a locking portion extending from each of the sidewalk in a direction opposite from the insertion direction, the locking portion for insertion into the attachment hole together with the insertion portion and locking the cover at the vehicle; and
   a reinforcing portion provided inside the insertion portion so as to reinforce the sidewalls, wherein
   the cover portion, the insertion portion, the locking portion, and the reinforcing portion are integrally formed, and
   the reinforcing portion extending in the insertion direction to a distal end surface so that when the locking portion is locked, the distal end surface of the reinforcing portion is extended through the attachment hole in the insertion direction.

2. The cover for the airbag device according to claim 1, wherein the reinforcing portion is also present at the position of the attachment hole and at a position closer to a rear end of the insertion portion in the insertion direction than the position of the attachment hole.

3. The cover for the airbag device according to claim 1, wherein the reinforcing portion is only formed in a rear end portion of the insertion portion and is located in a position away from a distal end portion of the insertion portion in the insertion direction.

4. The cover for the airbag device according to claim 1, wherein the cover portion, the insertion portion, the locking portion, and the reinforcing portion are integrally formed from a thermoplastic elastomer.

5. The cover for the airbag device according to claim 1 incorporated into an airbag device having an airbag, the airbag being covered by the cover portion.

6. The cover for the airbag device according to claim 1, wherein the insertion portion is cylindrical in shape.

7. The cover for the airbag device according to claim 1, further comprising: a base portion provided in a region where the airbag is not deployed, the base portion extending from the cover portion, wherein a noise suppression portion formed on the base portion for suppressing noise generated when the base portion makes contact with a portion on the vehicle.

8. The cover for the airbag device according to claim 7, wherein the base portion has a surface in which the insertion portion is formed so as to protrude, and the noise suppression portion includes a plurality of portions formed so as to protrude from the surface of the base portion.

9. The cover for the airbag device according to claim 1, wherein the reinforcing portion extends between the sidewalls and is a connecting portion that connects an inner surface of one of the sidewalls with another inner surface of another of the sidewalls.

10. The cover for the airbag device according to claim 9, wherein the insertion portion has a cross-sectional shape with a length in a horizontal direction that is longer than a length in a vertical direction, and the reinforcing portion includes a plurality of vertical connecting portions spaced from each other in the horizontal direction so as to connect an inner surface of the insertion portion with another inner surface of the insertion portion in the vertical direction.

11. The cover for the airbag device according to claim 10, wherein the reinforcing portion further includes a horizontal connecting portion that extends from the plurality of vertical connecting portions in the horizontal direction so as to connect the plurality of vertical connecting portions with each other.

12. The cover for the airbag device according to claim 11, wherein the locking portion is, when being locked to the vehicle, bent and deformed in a direction closer to the horizontal connecting portion and is then deformed in a direction away from the horizontal connecting portion due to elastic restoration, whereby the locking portion is locked to the vehicle, and the horizontal connecting portion is located so as to restrict a maximum amount of bending by the locking portion.

13. The cover for the airbag device according to claim 12, wherein a pair of the locking portions is provided so as to face each other with the horizontal connecting portion being interposed between the pair of the locking portions.

14. The cover for the airbag device according to claim 11, wherein an end surface of the horizontal connecting portion closer to the airbag is accessible when an operator inserts the insertion portion into the attachment hole.

15. The cover for the airbag device according to claim 14, further comprising:
a base portion provided in a region where the airbag is not deployed, the base portion extending from the cover portion, wherein
the base portion includes:
a first surface in which the insertion portion is formed so as to protrude; and
a second surface on a side opposite to the first surface, having the end surface of the horizontal connecting portion closer to the airbag.

16. The cover for the airbag device according to claim 14, further comprising:
a base portion provided in a region where the airbag is not deployed, the base portion extending from the cover portion, wherein
the base portion includes:
a first surface in which the insertion portion is formed so as to protrude from the first surface; and
a second surface on a side opposite to the first surface, and one of the plurality of vertical connecting portions connected to the first surface.

17. A cover for an airbag device, the cover to be attached to a vehicle via an attachment hole of the vehicle, comprising:
a cover portion configured to cover the airbag in a folded state;
a hollow insertion portion configured to be inserted into the attachment hole on the vehicle;
a locking portion for insertion into the attachment hole together with the insertion portion and locking the cover at the vehicle; and
a reinforcing portion provided inside the insertion portion so as to reinforce the insertion portion, wherein
the cover portion, the insertion portion, the locking portion, and the reinforcing portion are integrally formed,
the reinforcing portion extending from an inner surface of the insertion portion so that when the locking portion is locked, an end of the reinforcing portion is at a position closer to a distal end side of the insertion portion in an insertion direction than a position of the attachment hole is to the distal end side of the insertion portion,
a base portion provided in a region where the airbag is not deployed, the base portion extending from the cover portion and including a first surface in which the insertion portion is formed so as to protrude; and a second surface on a side opposite to the first surface, the base portion further including a penetration hole that penetrates through the first and second surfaces, the penetration hole being formed at such a position that the locking portion can be seen from the second surface through the penetration hole and that the locking portion can be operated through the penetration hole to be in an unlocked state.

18. A cover for an airbag device, the cover to be attached to a vehicle via an attachment hole of the vehicle, comprising:
a cover portion configured to cover the airbag in a folded state;
a hollow insertion portion configured to be inserted into the attachment hole on the vehicle;
a locking portion for insertion into the attachment hole together with the insertion portion and locking the cover at the vehicle; and
a reinforcing portion provided inside the insertion portion so as to reinforce the insertion portion, wherein
the cover portion, the insertion portion, the locking portion, and the reinforcing portion are integrally formed,
the reinforcing portion extending from an inner surface of the insertion portion so that when the locking portion is locked, an end of the reinforcing portion is at a position closer to a distal end side of the insertion portion in an insertion direction than a position of the attachment hole is to the distal end side of the insertion portion,
a base portion provided in a region where the airbag is not deployed, the base portion extending from the cover portion, the base portion including a first surface in which the insertion portion is formed so as to protrude and a second surface on a side opposite to the first surface, and
wherein a noise suppression portion is formed on the first surface for suppressing noise generated when the base portion makes contact with a portion on the vehicle.

19. The cover for the airbag device according to claim 18, wherein the noise suppression portion includes a plurality of portions formed so as to protrude from the first surface.

* * * * *

UNITED STATES PATENT AND TRADEMARK OFFICE
CERTIFICATE OF CORRECTION

Page 1 of 1

PATENT NO. : 9,022,415 B2
APPLICATION NO. : 13/979213
DATED : May 5, 2015
INVENTOR(S) : Minhun Kim, Jinhua Piao and Atsushi Yamada It is certified that error appears in the above-identified patent and that said Letters Patent is hereby corrected as shown below:

In the Claims

Col. 12, in claim 1, line 32, after "the", delete "sidewalk" and insert --sidewalls--

Signed and Sealed this
Fifteenth Day of September, 2015

Michelle K. Lee
*Director of the United States Patent and Trademark Office*